(12) United States Patent
Convent et al.

(10) Patent No.: US 10,408,658 B2
(45) Date of Patent: Sep. 10, 2019

(54) FILL LEVEL SWITCH ARRANGEMENT AND METHOD FOR DETERMINING THE FILL LEVEL OF A MEDIUM

(71) Applicant: KROHNE Messtechnik GmbH, Duisburg (DE)

(72) Inventors: Thomas Convent, Issum (DE); Michael Gerding, Bochum (DE); Robert Storch, Lüdenscheid (DE)

(73) Assignee: KROHNE MESSTECHNIK GMBH, Duisburg (DE)

( * ) Notice: Subject to any disclaimer, the term of this patent is extended or adjusted under 35 U.S.C. 154(b) by 0 days.

(21) Appl. No.: 15/798,579

(22) Filed: Oct. 31, 2017

(65) Prior Publication Data

US 2018/0120140 A1 May 3, 2018

(30) Foreign Application Priority Data

Oct. 31, 2016 (DE) .................. 10 2016 120 727

(51) Int. Cl.
  *G01F 23/00* (2006.01)
  *G01F 23/22* (2006.01)
  (Continued)

(52) U.S. Cl.
  CPC ...... *G01F 23/0061* (2013.01); *G01F 23/0069* (2013.01); *G01F 23/22* (2013.01); *G01F 23/2845* (2013.01); *G01F 23/185* (2013.01)

(58) Field of Classification Search
  CPC ........ B67D 7/145; B67D 7/425; B67D 7/348; B67D 7/22; B67D 7/08; G01F 23/0007; G01F 23/0084; G01F 23/70; G01F 23/74; G01F 23/0061; G01F 23/22; G01F 23/185; Y10T 137/7306
  See application file for complete search history.

(56) References Cited

U.S. PATENT DOCUMENTS 7,107,836 B2  9/2006  Brookner
8,933,789 B1  1/2015  Fink et al.
(Continued)

FOREIGN PATENT DOCUMENTS

DE        198 33 966 A1      2/2000
DE    10 2005 044 188 A1     4/2007
(Continued)

*Primary Examiner* — Emily C Terrell
(74) *Attorney, Agent, or Firm* — David S. Safran; Roberts Mlotkowski Safran Cole & Calderon, P.C.

(57) ABSTRACT

A fill level switch arrangement (1) for determining the fill level of a medium (2) in a container (3) and a method for determining the fill level of a medium (2) in a container (3) using a fill level switch arrangement (1). The fill level switch arrangement (1) has at least one alarm threshold that can be implemented in a simplified manner due to the fill level switch arrangement (1) having a transmitting element (4) and a receiving element (5), wherein the transmitting element (4) is used for transmitting a radio signal and is operatively connected to the receiving element (4), wherein the receiving element (5) is configured to detect radio signals, and wherein the receiving element (5) is configured such that it generates and transmits a switching signal in the event of a change in the received radio signal caused by the medium (2).

10 Claims, 6 Drawing Sheets

(51) Int. Cl.
*G01F 23/284* (2006.01)
*G01F 23/18* (2006.01)

(56) References Cited

U.S. PATENT DOCUMENTS

| | | | |
|---|---|---|---|
| 9,347,848 B1* | 5/2016 | Westmoreland | G01C 9/02 |
| 9,752,917 B2 | 9/2017 | Weber | |
| 2002/0116999 A1* | 8/2002 | Heger | G01F 23/265 |
| | | | 73/304 C |
| 2004/0035465 A1* | 2/2004 | Cazden | E04H 4/12 |
| | | | 137/392 |
| 2005/0156123 A1* | 7/2005 | Schnell | G01F 23/292 |
| | | | 250/573 |
| 2005/0241391 A1* | 11/2005 | Kull | G01F 23/284 |
| | | | 73/313 |
| 2006/0132351 A1* | 6/2006 | Le Sesne | G01F 23/284 |
| | | | 342/124 |
| 2007/0101809 A1 | 5/2007 | Roesner | |
| 2008/0017758 A1* | 1/2008 | Johnson | B64D 37/00 |
| | | | 244/135 R |
| 2009/0121917 A1* | 5/2009 | Delin | G01F 23/284 |
| | | | 342/124 |
| 2009/0224930 A1* | 9/2009 | Burza | G01F 23/68 |
| | | | 340/618 |
| 2010/0280771 A1* | 11/2010 | Mukherjee | G01F 23/284 |
| | | | 702/55 |
| 2013/0333465 A1* | 12/2013 | Nilsson | G01S 7/28 |
| | | | 73/290 V |
| 2014/0070943 A1 | 3/2014 | Breed | |
| 2014/0210670 A1 | 7/2014 | Weber | |
| 2014/0292892 A1 | 10/2014 | Dan | |
| 2016/0273953 A1 | 9/2016 | Schlensker | |
| 2018/0143061 A1* | 5/2018 | Strong | G01F 23/284 |

FOREIGN PATENT DOCUMENTS

| | | |
|---|---|---|
| DE | 10 2007 027 171 A1 | 1/2009 |
| DE | 10 2012 100 936 A1 | 8/2013 |
| DE | 10 2012 011 165 A1 | 12/2013 |
| DE | 20 2013 103 563 U1 | 12/2014 |
| DE | 10 2014 222 298 A1 | 5/2016 |

* cited by examiner

FILL LEVEL SWITCH ARRANGEMENT AND METHOD FOR DETERMINING THE FILL LEVEL OF A MEDIUM

BACKGROUND OF THE INVENTION

Field of the Invention

The invention relates to a fill level switch arrangement for determining the fill level of a medium in a container. The invention also relates to a method for determining the fill level of a medium.

Description of Related Art

Fill level switches are generally used to implement upper or lower alarm thresholds in tanks or silos. The fill level switches are mounted either horizontally on the side through the tank wall or mounted vertically either through the tank cover or tank floor. Various technical implementations are known from the prior art in order to detect a medium at the level of the level switch, such as, for example, a tuning fork switch or switch with capacitive detection. These switches have in common that the respective switches independently detect contact—and thus when the switching threshold is exceeded—and convert it into corresponding switching signals; for example, a switching output of the fill level switch is opened or closed, but active signals can also be output via the switching output.

SUMMARY OF THE INVENTION

The object of the invention is to provide a fill level switch arrangement with which at least one alarm threshold can be implemented in a simplified manner.

The object is initially and essentially achieved in that the fill level switch arrangement has a transmitting element and a receiving element, wherein the transmitting element is used to transmit a radio signal and is operatively connected to the receiving element. The receiving element is used to detect the radio signal and is configured in such a manner that it generates and outputs a switching signal in the event of a modification of the received signal caused by the medium. In contrast to the fill level switches known from the prior art, an arrangement consisting of a transmitting element and a receiving element and a use of radio signals are provided according to the invention, i.e., the fill level switch arrangement is based on a "transmitter-receiver principle".

The modification of the radio signal transmitted by the transmitting element and received by the receiving element is effected by damping the signal by the medium. The intensity of the damping is dependent on the particular nature of the medium. Damping can also be so intense that no further signal arrives at the receiver element. A lack of the received radio signal is thus also a modification of the received signal in the sense of the invention, which is detected and by means of which a switching signal is generated and output. The switching signal can be such that control outputs are switched by the switching signal.

It is also conceivable that the switching signal is sent to a control room. The control room can then take appropriate further measures.

A modification of the radio signal can occur when the transmitting element is covered by medium, but also when the receiving element is covered by medium. In the case of only one transmitting element and only one receiving element, it is fundamentally not possible to distinguish which of the two elements is covered by medium. Configurations of the fill level switch arrangement deal with a specific distinction possibility, which are discussed below.

When it is said that the transmitting element and the receiving element are operatively connected to one another, this means that the transmitting element and the receiving element are aligned to one another in such a manner that the receiving element can receive the radio signals transmitted by the transmitting element, i.e., the signals strike the receiving element.

A preferred configuration of the fill level switch arrangement according to the invention is characterized in that the transmitting element and the receiving element are designed as a combined transceiver element. The fill level switch arrangement then has a reflector for reflecting the transmitted radio signal, wherein the reflector is operatively connected to the transceiver element such that the transmitted radio signal is reflected in the direction of the transceiver element. The radio signal transmitted by the transceiver element therefore strikes the reflector and is reflected back to the transceiver element, where it is then received.

A particularly preferred configuration of the fill level switch arrangement according to the invention is characterized in that the transmitting element transmits a non-directional radio signal. The advantage of this configuration is that, in the case of a non-directional radio signal, the transmitting element and the receiving element do not have to be directly aligned to one another in order to be able to be connected in an effective manner since a non-directional signal can be received at any position in the container. The transmitting element and the receiving element can then, for example, be arranged as separate elements on the same side of the container. The receiving element preferably has a non-specific directional characteristic so that it can receive the non-directed signal of the transmitting element.

A further configuration of the fill level switch arrangement according to the invention is characterized in that the transmitting element is designed in such a manner that the transmitted radio signal is coded with a first coding and that the receiving element has a decoding unit such that the receiving element assigns the radio signal coded with the first coding to the first transmitting element. The switching signal is generated and output only when the radio signal associated with the first transmitting element exhibits a change. This configuration proves to be particularly advantageous when the medium is in a non-closed container. In that case, if necessary, further external signals can strike the receiving element so that the signal transmitted by the transmitting element cannot be recognized separately as the signal transmitted by the transmitter element without coding. Due to the coding, the receiving element can recognize, without a doubt, whether the received signal originates from the transmitting element, or whether it is an external signal. Coding of the transmitted radio signal can, for example, be effected by modulating the radio signal or by superimposing the radio signal with a further signal. It is also conceivable for the coding to be effected by the use of a predetermined frequency. The decoding unit is then configured as a corresponding bandpass matched to the predetermined frequency.

A further configuration is characterized in that the fill level switch arrangement has at least a second transmitting element for transmitting a second radio signal. The second transmitting element is configured in such a manner that the second radio signal is coded with a second coding. The decoding unit of the receiving element is also configured in such a manner that the receiving element assigns the received radio signal coded with the second coding to the second transmitting element. When the second radio signal is modified, the receiving element generates and outputs a second switching signal. The second transmitting element is also operatively connected to the receiving element. The second transmitting element can also preferably transmit a non-directional radio signal. The advantage of using a second transmitting element is that a further fill level switch threshold or alarm threshold is implemented.

In a preferred configuration, the first transmitting element is arranged at a height $h_1$ in the container and the second transmitting element is at a height $h_2$. The first height $h_1$ and the second height $h_2$ are different. When the fill level of the medium reaches the first height $h_1$ in the container, the radio signal transmitted by the first transmitting element is modified by the medium. This modification is recognized by the receiving element and a first switching signal is output. If the level of the medium rises further, up to the height $h_2$, the radio signal transmitted by the second transmitting element is also modified by the medium. This modification of the second radio signal is also detected by the receiving element and a second switching signal is output. The receiving element is arranged here at a height above the height $h_2$.

The fill level switch arrangement according to the invention is not limited to the use of two transmitting elements. Rather, n transmitting elements can be provided, which are arranged, in particular, at n different heights in the container. The n different transmitting elements transmit n different coded radio signals, which can be assigned to the respective transmitting elements by the decoding unit of the receiving element. The fill level switch arrangement according to the invention thus makes it possible to determine an arbitrary number of fill levels in a very simple and uncomplicated manner.

Up to now, the case has been considered in which only one receiving element and a plurality of transmitting elements are provided. By coding the signals and using the decoding unit, the signals can be clearly assigned to the respective transmitting elements, and the fill levels corresponding to the arrangement height of the transmitting elements can thus be detected or determined.

A further configuration of the fill level switch arrangement according to the invention provides that it has at least a second receiving element. If the fill level switch arrangement has, for example, a transmitting element and a first and a second receiving element, wherein the first receiving element and the second receiving element are arranged at different heights in the container, then, when the fill level of the medium is the same height as the first receiving element, the first receiving element detects a modification in the radio signal, then generates and outputs a first switching signal. When the fill level reaches the height of the second receiver element, the second receiver element detects a modification of the radio signal, and generates and outputs a second switching signal. Preferably, the transmitting element is arranged at a height above the highest receiving element in the container. This configuration of the fill level switch arrangement according to the invention is also not limited to the use of two receiving elements. Rather, m different receiving elements arranged at m different heights can be used to detect m fill levels.

A preferred configuration of the fill level switch arrangement according to the invention is characterized in that the transmitting element has a detection surface and that the transmitting element generates and outputs a switching signal when the detection surface comes into contact with medium. The explanations apply to each transmitting element used in the level switch arrangement. The transmitting element is now equipped with its own evaluation unit so that it can detect if the fill level of the medium is at the level of the transmitting element. This additional fill level information is used for redundant signal evaluation, whereby an increased reliability of the fill level switch arrangement can be achieved. Now, two switching signals are generated at one fill level and either internally processed or transmitted when the fill level of the medium has risen to the level of the respective transmitting element, namely the first from the receiving element and the second from the transmitting element itself. If both switching signals are sent to the control room, the comparison of the switching signals can take place here. If a switching signal fails, for example because the receiving element has an error and does not operate reliably, the second switching signal is still output by the transmitting element itself, so that the fill level is reliably detected despite the failure of the receiving element and can be handled appropriately, for example the switching of control outputs takes place nevertheless. The switching signal transmitted by the transmitting element is clearly assigned to the transmitting element. Thus, it can be guaranteed that, when several transmitting elements are used, the plurality of switching signals can be distinguished from one another.

A further preferred configuration of the fill level switch arrangement provides that the transmitting element has a sensor for detecting a physical variable of the medium. The transmitting element is designed in such a manner that it converts the detected variable into a secondary radio signal and transmits it. The receiving element transmits the secondary radio signal to an evaluation unit, which outputs a value for the detected physical variable. The sensor can, for example, be a temperature sensor. It is also conceivable that it is a pH sensor or, for example, a pressure sensor. If a plurality of transmitting elements are present, then all transmitting elements can have the same type of sensor, i.e., for example, all have a temperature sensor. Thus, for example, the temperature of the medium could be measured at different locations in the container. It is also conceivable that different sensors are assigned to the different transmitting elements, the first transmitting element, for example, has a temperature sensor, and the second transmitting element comprises a pH sensor.

The invention further relates to a method for determining the fill level of a medium in a container with a fill level switch arrangement. The fill level switch arrangement has a transmitting element for transmitting a radio signal and a receiving element for detecting the radio signal, wherein the transmitting element is operatively connected to the receiving element. The method according to the invention is characterized in that, in a first step, a radio signal is transmitted from the transmitting element and, in a second step, the radio signal is received by the receiving element. In a third step, the received radio signal is compared with a predetermined comparison radio signal. When a deviation of the received radio signal from the comparison radio signal detected by the comparison is detected, a switching signal is generated and output by the receiving element in a fourth step. Preferably, a non-directional radio signal is transmitted from the transmitting element, which is then received by the receiving element. The method according to the invention is thus based on a transmitter-receiver principle and represents an uncomplicated variation for determining the fill level of a medium.

A preferred configuration of the method according to the invention, in which the receiving element of the fill level switch arrangement comprises a decoding unit, is characterized in that the radio signal transmitted by the transmitting element is coded with a first coding, the coded radio signal is decoded by the decoding unit, and the radio signal is assigned to the transmitting element. In this configuration according to the invention, a switching signal is generated and transmitted only when the coded radio signal exhibits a change. By means of this configuration, it can be ensured that no switching signals are erroneously output due to external radio signals that were not transmitted by the transmitting element.

A further preferred configuration of the method according to the invention in which the fill level switch arrangement has a second transmitting element is characterized in that, in a fifth step, a radio signal is transmitted from the second transmitting element, that the radio signal is received by the receiving signal in a sixth step, that the received radio signal is compared with a predetermined comparison radio signal in a seventh step, and, in an eighth step, in the case of a deviation of the received radio signal from the comparison radio signal determined due to the comparison, a switching signal is generated and output by the receiving element. In the method according to the invention, therefore, two switching operations take place, namely a first one in the detection of a change in the first radio signal transmitted by the first transmitting element and a second one in the detection of a change in the second radio signal transmitted by the second transmitting element. The method according to the invention makes it possible to detect two different fill levels in a simple manner when the first and second transmitting elements are arranged at different heights in the container.

A further configuration of the method according to the invention is characterized in that, in an additional step, a physical variable of the medium is detected by a sensor in the transmitting element. The detected variable is then converted into a secondary signal superimposed on the radio signal. The secondary signal is transmitted from the receiving element to an evaluation unit, and the evaluation unit outputs a value for the physical variable.

The invention is based on the idea of using at least one transmitting element known per se and at least one receiving element known per se in an unusual manner, namely to implement one or more level switches. The invention, thus, also relates to the use of a transmitting element for transmitting a radio signal and a receiving element for receiving the radio signal for a fill level switch arrangement for determining the fill level of a medium in a container, wherein the transmitting element is used to transmit a radio signal and to function with the receiving element. The receiving element is used to detect the radio signal and is designed in such a manner that it generates and outputs a switching signal in the event of a modification of the received signal caused by the medium. The explanations made in respect to the device and/or in in respect to the method also apply for the further use of a transmitting element and a receiving element for a fill level switch arrangement.

Since the method according to the invention and the use according to the invention relate to the determination of a fill level with a fill level switch arrangement according to the invention, all explanations made in the context of the description of the fill level switch arrangement according to the invention relate to the method according to the invention and the use according to the invention and vice versa. This also applies in particular to the determination of a plurality of fill levels with a plurality of receiving elements instead of a plurality of transmitting elements.

In detail, there is a plurality of possibilities for designing and further developing the fill level switch arrangement according to the invention and the method according to the invention as will be apparent from the following description of preferred embodiments of the invention with reference to the accompanying drawings.

DETAILED DESCRIPTION OF THE INVENTION

Figure 1:
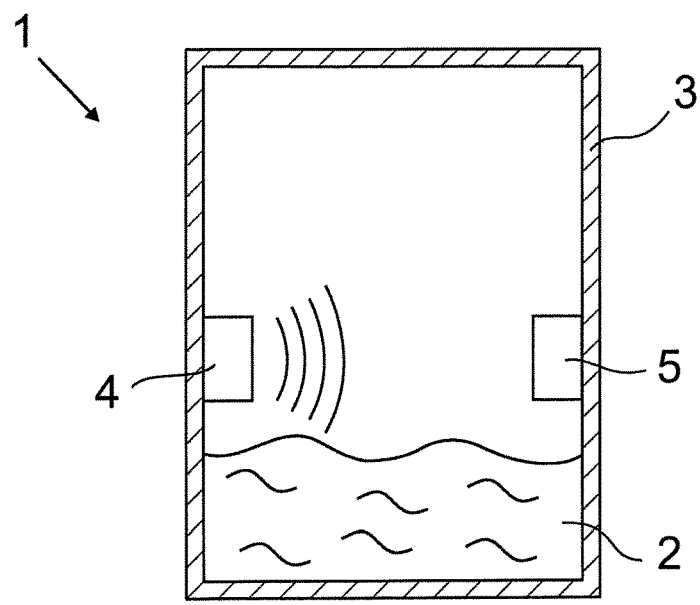
FIG. 1 is a schematic representation of a fill level switch arrangement with a transmitting element and a receiving element.

FIG. 1 schematically shows a fill level switch arrangement 1 according to the invention for determining the fill level of a medium 2 in a container 3. The fill level switch arrangement 1 has a transmitting element 4 which transmits a radio signal. Furthermore, the fill level switch arrangement 1 has a receiving element 5, which is operatively connected to the transmitting element 4 and receives the radio signal. If the medium 2 reaches a fill level at the height of the transmitting element 4 or of the receiving element 5, the radio signal, thus, has to propagate through the medium 2, then the radio signal is modified by the medium 2. The modification can be observed, for example, by way of a damping of the radio signal. The receiving element 5 is designed in such a manner that it generates and outputs a switching signal when the received radio signal is modified. The fill level switch arrangement 1 thus uses the transmitter-receiver principle.

Figure 2:
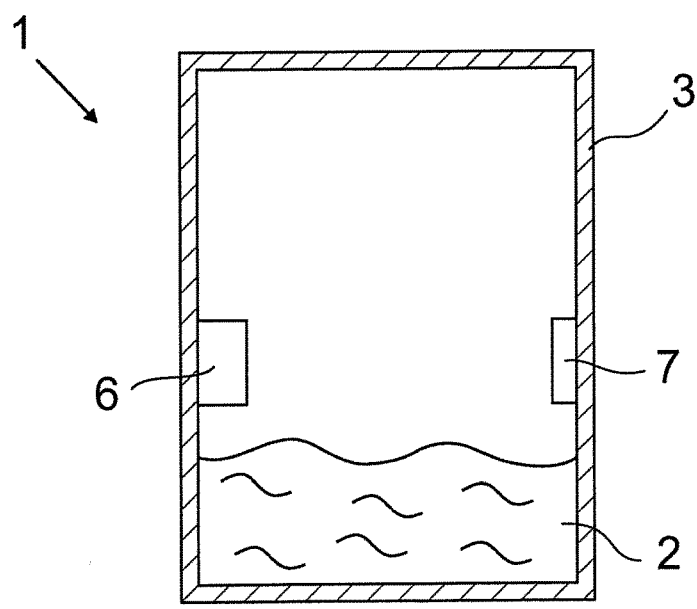
FIG. 2 is a schematic representation of a fill level switch arrangement, in which the transmitting element and the receiving element are configured in a combined transceiver element.

FIG. 2 shows an embodiment of the fill level switch arrangement 1 in which the transmitting element and the receiving element are formed in a single transceiver element 6. The fill level switch arrangement 1 then additionally has a reflector 7. The transceiver element 6 and the reflector 7 are operatively connected in such a manner that the radio signal transmitted by the transceiver element 6 strikes the reflector 7 and is reflected back in the direction of the transceiver element 6, so that it can be received by the transceiver element 6. Here, too, a switching signal is generated and output when the received radio signal is modified.

Figure 3:
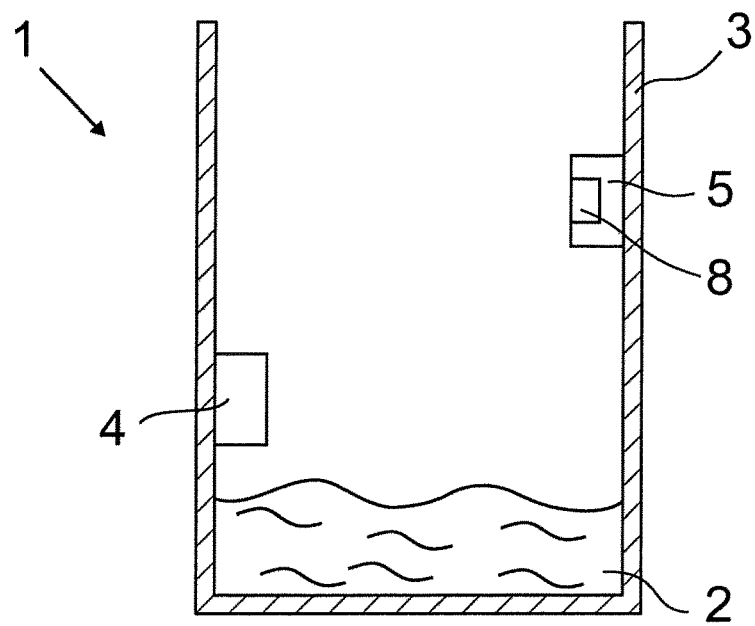
FIG. 3 is a further schematic representation of a fill level switch arrangement.

In contrast to FIG. 1 and FIG. 2, the transmitting element 4 and the receiving element 5 are not arranged at the same height in the container 3 in the fill level switch arrangement 1 shown in FIG. 3. Instead, the receiving element 5 is arranged higher than the transmitting element 4. The illustrated transmitting element 4 is characterized in that it transmits a non-directional radio signal. This has the advantage that the receiving element 5 can be arranged at any location in the container 3 and can still receive the non-directional radio signal. The receiving element 5 then has a non-specific directional characteristic.

The container 3 illustrated in FIG. 3 is not closed, in contrast to the containers 3 shown in FIGS. 1 and 2, but is open at the top. Since the container 3 is open, radio signals can enter the container 3 from the surroundings and strike the receiving element 5. It is not possible for the receiving element 5 to distinguish whether the received radio signal is the radio signal transmitted by the transmitting element 4 or a radio signal from the surroundings. In order to nevertheless ensure such a distinction, and thus to prevent an erroneous switching of the fill level switch arrangement, the transmitting element 4 is designed in such a manner that the transmitted radio signal is coded with a first coding. The receiving element 5 has a decoding unit 8 designed such that the receiving element 5 assigns the radio signal coded with the first coding to the transmitting element 4. The receiving element 5 generates a switching signal only when it detects a modification of the signal assigned to the transmitting element 4. If an external radio signal now strikes the receiving element 5 and if this external radio signal is modified, no switching signal is generated.

Figure 4:
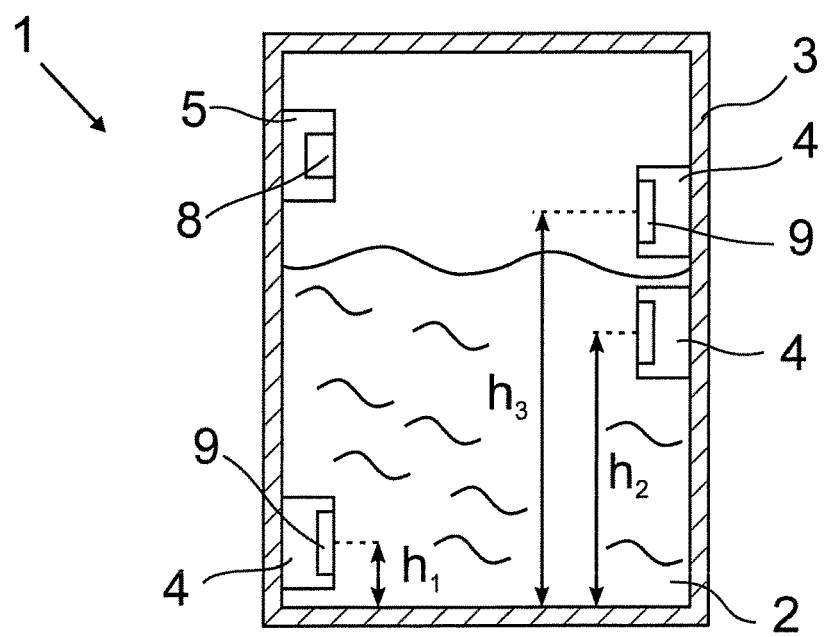
FIG. 4 is a schematic representation of a fill level switch arrangement having several intelligent transmitting elements and a receiving element.

FIG. 4 shows a fill level switch arrangement 1 with three transmitting elements 4 and a receiving element 5. The transmitting elements 4 are arranged at three different heights $h_1$, $h_2$ and $h_3$ in the container 3. Each of the three transmitting elements 4 transmits a radio signal with a coding assigned to the respective transmitting element 4. The receiving element 5 has a decoding unit 8 designed such that the receiving element 5 can assign the received radio signals to the respective transmitting elements 4. When the fill level of the medium 2 reaches the first height $h_1$, this leads to a modification of the radio signal transmitted by the first transmitting element 4. This modification is detected so that the receiving element 5 generates and outputs a first switching signal. If the fill level of the medium 2 rises further to the height $h_2$, this leads to a modification of the radio signal transmitted by the second transmitting element 4. This modification is also detected, and since the receiving element 5 assigns the modified radio signal to the second transmitting element 4 by means of the decoding unit 8, a second switching signal is generated and output. A further increase in the fill level of the medium 2 to the height $h_3$ of the third transmitting element 4 leads to a modification of the radio signal transmitted by the third transmitting element 4, wherein the signal is detected by the receiving element 5, which then generates and outputs a third switching signal. It is thus possible to determine a plurality of fill levels of the medium 2 with the fill level switch arrangement 1 in a very simple and elegant manner without great effort and to switch it accordingly.

The transmitting elements 4 in FIG. 4 additionally have a detection surface 9. The detection surface 9 is designed such that it is able to detect as soon as it comes into contact with medium 2. If the detection surface 9 comes into contact with medium 2, the transmitting element 4 generates and outputs a switching signal. By designing an "intelligent" transmitting element 4, the reliability of the fill level switch arrangement 1 is increased. In the event of the failure of, for example, the receiving element 5 or in the event of an error in the transmission of the switching signal of the receiving element 5, the fill level switch arrangement 1 is, nevertheless, functional due to the switching signal generated and output by the transmitting element 4.

Figure 5:
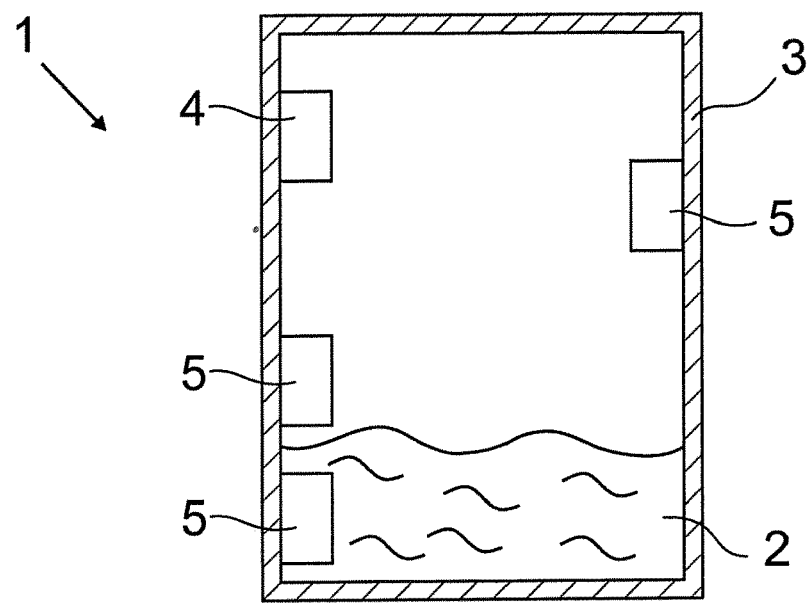
FIG. 5 is a schematic representation of a fill level switch arrangement having several receiving elements and a transmitting element.

FIG. 5 shows an embodiment of the fill level switch arrangement 1, which has a transmitting element 4 and three receiving elements 5. With this arrangement, three different switching signals can also be generated reliably, namely a first one by the first receiving element 5, since a modification of the radio signal transmitted by the transmitting element 4 also occurs when the receiving element 5 is covered by medium, a second switching signal by the second receiving element 5 as soon as the fill level reaches the height of the second receiving element 5, and a third switching signal by the third receiving element 5 as soon as the fill level reaches the height of the third receiving element 5.

Figure 6:
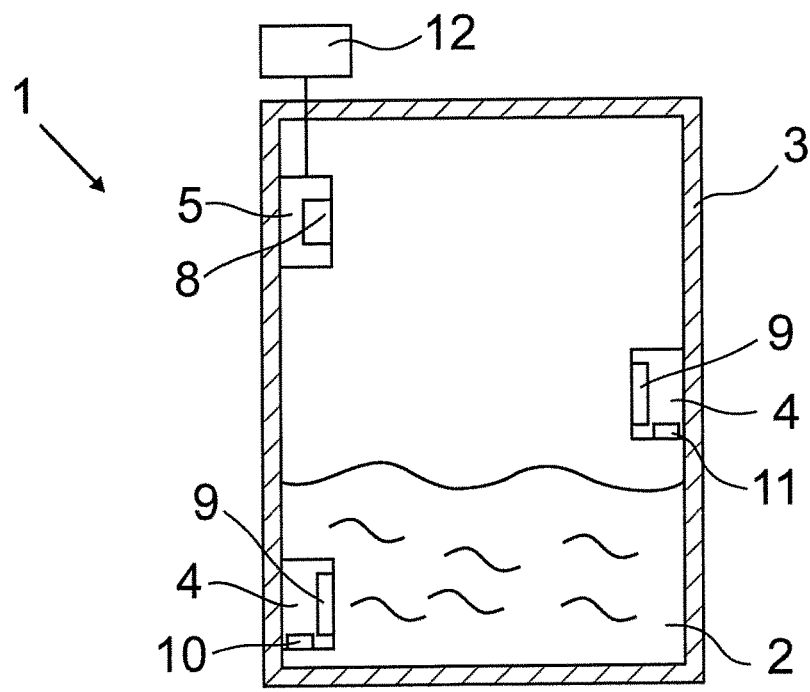
FIG. 6 is a schematic representation of a fill level switch arrangement with several transmitting elements and a receiving element, in which the transmitting elements have sensors for detecting physical variables of the medium.

The fill level switch arrangement 1 shown in FIG. 6 has transmitting elements 4 which, in addition to the detection surface 9, have a sensor that is used to detect a physical variable of the medium 2. One of the illustrated transmitting elements 4 has a temperature sensor 10, the other illustrated transmitting element 4 has a pH sensor 11. The transmitting elements 4 are designed such that they convert the respectively detected variable into a secondary radio signal and transmit it. The receiving element 5 transmits the secondary radio signals to an evaluation unit 12 which outputs a value for the respective detected physical variable, i.e. in the present case a value for the temperature of the medium 2 and, when the pH sensor 11 comes into contact with the medium 2, a value for the pH of the medium 2.

Figure 7:
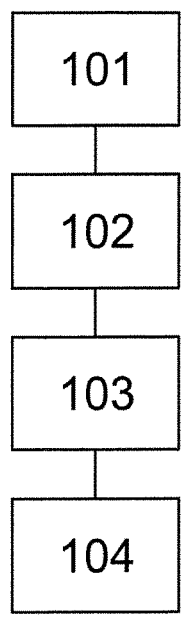
FIG. 7 is a block diagram of a first embodiment of the method according to the invention.

FIG. 7 shows a block diagram of an embodiment of the method for determining the fill level with the fill level switch arrangement 1. In a first step 101, a radio signal is transmitted by the transmitting element 4. The radio signal is then received by the receiving element 5 in a second step 102. In a third step 103, the received radio signal is compared with a comparison radio signal. In a fourth step 104, a switching signal is then generated and output by the receiving element 5 in the case of a deviation, determined by the comparison, of the received radio signal from the comparison radio signal. The transmitted radio signal can be a directed radio signal, but in particular also a non-directional radio signal.

Figure 8:
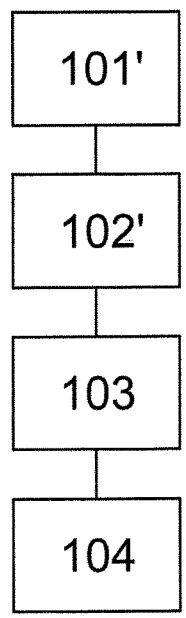
FIG. 8 is a block diagram of a second embodiment of the method according to the invention.

A variation of the method is shown in the block diagram in FIG. 8. Here, in step 101', the transmitted radio signal is coded with a first coding. In step 102', the received coded radio signal is decoded by means of a decoding unit 8 in the receiving element 5 and clearly assigned to the transmitting element 4. The radio signal assigned to the transmitting element 4 is then compared with a comparison radio signal in step 103, and then, in step 104, a switching signal is generated and output by the receiving element 5 when there is a deviation of the received coded radio signal from the comparison radio signal detected in the comparison. Steps 103 and 104 are carried out only if the received radio signal was able to be assigned clearly to the transmitting element 4 due to the coding. If a radio signal strikes the receiving element 5 that does not have the coding and thus cannot be assigned to the transmitting element 4, no comparison takes place with the comparison radio signal and no switching signal is generated. Thus, the method prevents an erroneous output of the switching signal due to external interfering radio signals.

Figure 9:
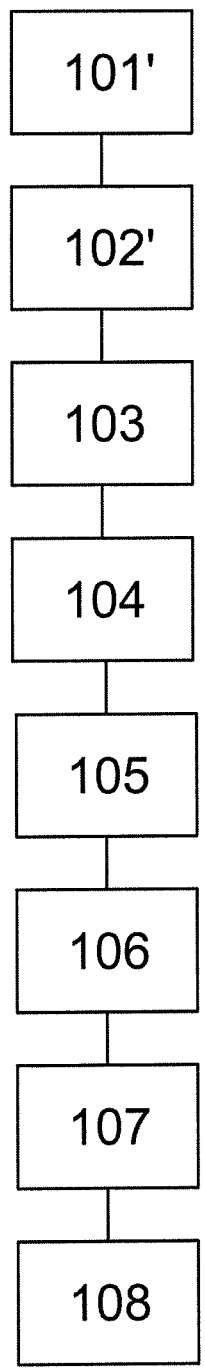
FIG. 9 is a block diagram of a third embodiment of the method according to the invention.

The block diagram shown in FIG. 9 has additional method steps 105, 106, 107 and 108. The method illustrated in FIG. 9 shows the determination of the fill level of a medium with a fill level switch arrangement that has a second transmitting element 4. In the additional method step 105, a second radio signal is transmitted by the second transmitting element 4. In step 106, the second radio signal is received by the receiving element 5. In step 107, a comparison is then made between the received second radio signal (coded and assigned to the second transmitting element 4) and a comparison radio signal. In step 108, a switching signal is then generated and output by the receiving element 5 when a deviation of the second radio signal from the comparison radio signal is detected in the comparison. The second radio signal is preferably coded with a second coding. The decoding unit 8 of the receiving element 5 is then designed in such a manner that the receiving element 5, with the help of the decoding unit 8, assigns the second radio signal coded with the second coding to the second transmitting element 4.

The method allows for a simple determination of two fill levels. However, the method is not limited to the determination of two fill levels, rather a plurality of fill levels can be determined with a corresponding number of transmitting elements.

Figure 10:
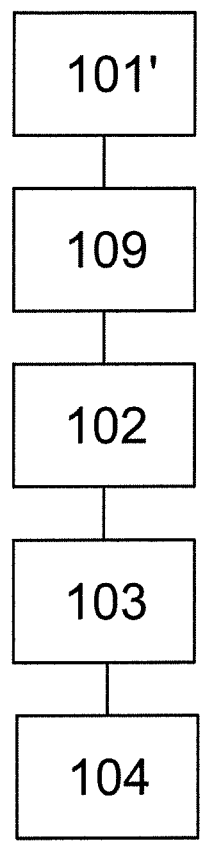
FIG. 10 is a block diagram of a fourth embodiment of the method according to the invention.

Finally, a further method step 109 is shown in the method shown in FIG. 10. In the method step 109, a physical variable of the medium 2 is detected by a sensor 10, 11 in the transmitting element 4 and converted into a secondary radio signal. The secondary radio signal is then superimposed on the radio signal transmitted by the transmitting element 4. The received secondary radio signal is then transmitted from the receiving element 5 to an evaluation unit 12 and a value for the physical variable is output from the latter. The physical variable of the medium can, for example, be the temperature, the pressure or the pH value.

What is claimed is:

1. A fill level switch arrangement for determining the fill level of a medium in a container, comprising:
   at least one transmitting element mounted at a respective height on a side wall of the container, and
   at least one receiving element mounted at a respective height on a side wall of the container that is above the respective height of the at least one transmitting element,
   wherein the at least one transmitting element serves to transmit a radio signal to the receiving element,
   wherein the receiving element is configured to detect radio signals issued by the at least one transmitting element, and
   wherein the receiving element is configured in a manner for generating and transmitting such that the receiving element generates and transmits a first switching signal in the event of a change in the radio signal received from at least one transmitting element caused by passage of the radio signal through the medium, and
   wherein the transmitting element has a detection surface and is configured in a manner for generating and transmitting a second switching signal when the detection surface comes directly into contact with the medium.

2. The fill level switch arrangement according to claim 1, wherein the transmitting element and the receiving element are configured as a combined transceiver element, and wherein the fill level switch arrangement has a reflector for reflecting the transmitted radio signal and the reflector is operatively connected to the transceiver element in such a manner that the transmitted radio signal is reflected in the direction of the transceiver element.

3. The fill level switch arrangement according to claim 1, wherein the transmitting element transmits a non-directional radio signal.

4. The fill level switch arrangement according to claim 1, wherein the at least one transmitting element comprises a plurality of transmitting elements, each of the transmitting elements being at a respective different height and being configured in such a manner that the transmitted radio signal is coded with a respective coding, wherein the receiving element has a decoding unit for determining from which of the transmitting elements a coded radio signal has been received, and wherein the switching signal is generated and transmitted only when the received radio signal exhibits a change.

5. The fill level switch arrangement according to claim 1, wherein the fill level switch arrangement has at least a second receiving element.

6. The fill level switch arrangement according to claim 1, wherein the transmitting element has a sensor for detecting a physical variable of the medium, wherein the transmitting element is configured such that it converts the detected variable into a secondary radio signal and transmits the secondary radio signal, and wherein the receiving element transmits the secondary radio signal to an evaluation unit which transmits a value for the detected physical variable.

7. Method for determining the fill level of a medium in a container with a fill level switch arrangement having at least one transmitting element on a wall of the container at a first location for transmitting a radio signal to a receiving element mounted on a wall of the container at a second location that is above the respective height of the at least one transmitting element for detecting the radio signal, wherein the transmitting element has a detection surface, comprising the steps of:
   transmitting a radio signal from the at least one transmitting element,
   receiving the radio signal by the receiving element,
   comparing the received radio signal with a predetermined comparison radio signal, and
   in the case of a deviation of the received signal from the comparison radio signal, due to the medium producing a change in the radio signal, generating and transmitting a first switching signal by the receiving element; and
   using the detection surface to generate and transmit a second switching signal when the detection surface directly comes into contact with the medium.

8. Method according to claim 7, wherein the receiving element of the fill level switch arrangement has a decoding unit, wherein the radio signal transmitted by the transmitting element is coded with a first coding, wherein the coded radio signal is decoded by the decoding unit and wherein whether the radio signal is from the transmitting element is determined.

9. Method according to claim 8, wherein the fill level switch arrangement comprises a plurality transmitting elements each of which transmits a radio signal with a respective coding, wherein, when a radio signal is received by the receiving element, from which of the transmitting elements the signal has been received is determined by the coding, wherein the received radio signal is compared with a predetermined comparison radio signal, and in the case of a deviation of any of the received radio signals from the comparison radio signal, the first switching signal is generated and transmitted by the receiving element.

10. Method according to claim 7, wherein in a further step, a physical variable of the medium is detected by a sensor in the transmitting element, wherein the detected variable is converted into a secondary signal, wherein the secondary signal is superimposed on the radio signal, wherein the secondary signal is transmitted from the receiving element to an evaluation unit, and wherein the evaluation unit outputs a value for the physical variable.

* * * * *